United States Patent
Kurokawa

(10) Patent No.: US 10,486,384 B2
(45) Date of Patent: Nov. 26, 2019

(54) PRESS SYSTEM AND CONTROL METHOD FOR PRESS SYSTEM

(71) Applicant: KOMATSU INDUSTRIES CORPORATION, Kanazawa-shi, Ishikawa (JP)

(72) Inventor: Takahiko Kurokawa, Nonoichi (JP)

(73) Assignee: Komatsu Industries Corporation, Kanazawa-shi, Ishikawa (JP)

( * ) Notice: Subject to any disclaimer, the term of this patent is extended or adjusted under 35 U.S.C. 154(b) by 185 days.

(21) Appl. No.: 15/557,509

(22) PCT Filed: Mar. 9, 2016

(86) PCT No.: PCT/JP2016/057304
§ 371 (c)(1),
(2) Date: Sep. 12, 2017

(87) PCT Pub. No.: WO2016/174933
PCT Pub. Date: Nov. 3, 2016

(65) Prior Publication Data
US 2018/0043649 A1    Feb. 15, 2018

(30) Foreign Application Priority Data
Apr. 30, 2015   (JP) ................. 2015-093051

(51) Int. Cl.
*B30B 15/00* (2006.01)
*G05B 15/02* (2006.01)
*B30B 15/28* (2006.01)

(52) U.S. Cl.
CPC .......... *B30B 15/0094* (2013.01); *B30B 15/28* (2013.01); *G05B 15/02* (2013.01); *B30B 15/281* (2013.01)

(58) Field of Classification Search
CPC ... B30B 15/0094; B30B 15/28; B30B 15/281; G05B 15/02
(Continued)

(56) References Cited

U.S. PATENT DOCUMENTS 4,519,040 A    5/1985   Brankamp et al.
5,142,769 A    9/1992   Gold et al.
(Continued)

FOREIGN PATENT DOCUMENTS

JP      S58-58932 A      4/1983
JP      H06-304800 A     11/1994
(Continued)

OTHER PUBLICATIONS

JP02007109511A, Shigetomo, "Crimping defect determination data forming method for terminal crimping defect detection device, and crimping defect determination data inspection method". Publication: Apr. 26, 2007.*
(Continued)

*Primary Examiner* — John H Le
(74) *Attorney, Agent, or Firm* — Drinker Biddle & Reath LLP

(57) ABSTRACT

A press system includes: a detection unit configured to detect a press load applied for pressing a workpiece; a reference waveform generation unit configured to generate a reference waveform for comparison, based on a load waveform of the press load detected by the detection unit; and a determination unit configured to determine whether a press abnormality is present, based on the load waveform of the press load detected by the detection unit and the reference waveform. The press system generates the reference waveform, and therefore, the state of press working can be determined by a simple method.

15 Claims, 14 Drawing Sheets

(58) Field of Classification Search
USPC .................................. 702/66; 72/15.1, 17.2
See application file for complete search history.

(56) References Cited

U.S. PATENT DOCUMENTS

| | | | | | |
|---|---|---|---|---|---|
| 5,692,404 | A | * | 12/1997 | Kirii | ............... B21D 24/00 72/15.1 |
| 5,724,843 | A | * | 3/1998 | Kirii | ............... B21D 24/00 72/17.2 |
| 2002/0130669 | A1 | | 9/2002 | Ishibashi et al. | |

FOREIGN PATENT DOCUMENTS

| | | | |
|---|---|---|---|
| JP | H07-164199 | A | 6/1995 |
| JP | H07-205244 | A | 8/1995 |
| JP | H10-193197 | A | 7/1998 |
| JP | 2001-113399 | A | 4/2001 |
| JP | 2002-352931 | A | 12/2002 |
| JP | 2007-59110 | A | 3/2007 |
| JP | 2007-61896 | A | 3/2007 |
| JP | 2007-109517 | A | 4/2007 |

OTHER PUBLICATIONS

Marposs K.K., Norimasa Koyanagi "System for Monitoring Process on Press Machine and its Functions" (Press Working, vol. 51, No. 8 (Aug. 2013, Special Extended Edition), Nikkan Kogyo Shimbun, Ltd., pp. 126-128).
Product Pamphlet for "BRANKAMP ECO 200" (Apr. 2013).

* cited by examiner

PRESS SYSTEM AND CONTROL METHOD FOR PRESS SYSTEM

TECHNICAL FIELD

The present invention relates to press systems, and particularly to a press system transporting and pressing a workpiece.

BACKGROUND ART

Press machines for pressing between a pair of dies while decreasing and increasing the distance between the dies have been used.

As a method for determining whether press working is acceptable or not, a method for determining whether press working is acceptable or not based on a comparison with a load curve of an intended quality, for example, has been proposed (Patent Document 1).

Specifically, methods have been disclosed according to which a reference waveform for a pressed product of an intended quality is registered in advance, and whether press working is acceptable or not is determined based on a comparison between the reference waveform and a load waveform during press working (Patent Documents 2 and 3).

CITATION LIST

Patent Document

PTD 1: Japanese Patent Laying-Open No. 6-304800
PTD 2: Japanese Patent Laying-Open No. 2007-61896
PTD 3: Japanese Patent Laying-Open No. 7-164199

SUMMARY OF INVENTION

Technical Problem

The methods disclosed in the above-referenced documents determine the state of press working by comparing a load waveform during press working with a reference waveform that is set and registered in advance, and the setting and registration of the reference waveform is time-consuming.

The present invention has been made to solve the above problem, and an object of the invention is to provide a press system and a control method for the press system that enable the state of press working to be determined by a simple method.

Solution to Problem

A press system according to an aspect includes: a detection unit configured to detect a press load applied for pressing a workpiece; a reference waveform generation unit configured to generate a reference waveform for comparison, based on a load waveform of the press load detected by the detection unit; and a determination unit configured to determine whether a press abnormality is present, based on the load waveform of the press load detected by the detection unit and the reference waveform. The press system generates the reference waveform and thus the state of press working can be determined by the simple method.

Preferably, the reference waveform generation unit is configured to generate, when the detection unit detects a same load waveform of the press load a plurality of times, the reference waveform based on the same load waveform. Thus, when the same load waveform of the press load is detected a plurality of times, the reference waveform is generated based on the same load waveform, and therefore, the reference waveform with high reliability can be generated and the state of press working can be determined by the simple method.

Preferably, the detection unit is configured to detect respective press loads at a plurality of locations. The reference waveform generation unit is configured to generate a plurality of reference waveforms for the respective plurality of locations, based on respective load waveforms of the press loads detected at the plurality of locations by the detection unit. The determination unit is configured to determine whether a press abnormality is present, based on the load waveforms of the press loads detected at the plurality of locations by the detection unit, and the reference waveforms for the respective plurality of locations. The reference waveform generation unit generates a plurality of reference waveforms for respective multiple locations, and whether a press abnormality is present is determined based on the generated reference waveforms, and therefore, the precision in determining whether a press abnormality is present can be improved.

Preferably, the reference waveform generation unit is configured to generate, when the detection unit successively detects a sane load waveform of the press load a plurality of times, the reference waveform based on the same load waveform. Accordingly, the reference waveform with higher reliability can be generated and the state of press working can be determined by the simple method.

Preferably, the press system further includes an acceptance unit configured to allow selection of one of a mode for registering the reference waveform in response to an instruction from a user and a mode for generating the reference waveform by the reference waveform generation unit. One of the modes can be selected to generate the reference waveform by the reference waveform generation unit or register the reference waveform in response to an instruction, which is convenient for users.

Preferably, the press system further includes a count unit configured to count the number of times the press load is applied, based on a result of determination by the determination unit. The number of times the press load is applied can be easily identified based on the result of counting by the count unit.

Preferably, the press system further includes an abnormality notification unit configured to provide notification of an abnormality based on a result of determination by the determination unit. The abnormality notification unit enables easy identification of an abnormality during press working.

Preferably, the press system further includes an abnormality notification unit configured to provide notification of an abnormality when the detection unit detects a different load waveform of a press load a predetermined number of times. The abnormality notification unit enables easy identification of an abnormality even when the reference waveform is not generated.

Preferably, the predetermined number of times is set to a numerical value larger than the number of stations for dies of the press system. Whether an abnormality is present can be determined by eliminating abnormalities that are likely to occur in the initial stage of press working.

Preferably, the reference waveform generation unit is configured to generate and update, when the detection unit detects a same load waveform of the press load a plurality of times, the reference waveform at predetermined intervals based on the same load waveform. Thus, the reference waveform is generated at predetermined intervals, and therefore, the state of press working influenced by change with time can be determined by the simple method.

Preferably, the press system further includes a registration unit configured to store, in a storage unit, the reference waveform generated at the predetermined intervals. The registration unit registers, in the storage unit, the reference waveform generated at predetermined intervals, and therefore, the state of press working can be analyzed based on change of the reference waveform with time.

A control method for a press system according to an aspect includes: detecting a press load applied for pressing a workpiece; generating a reference waveform for comparison, based on a load waveform of the detected press load; and determining whether a press abnormality is present, based on the load waveform of the detected press load and the reference waveform. The press system thus generates the reference waveform, and therefore, the state of press working can be determined by the simple method.

Preferably, the generating of the reference waveform includes generating the reference waveform when a same load waveform of the press load is detected a plurality of times, based on the same load waveform. Thus, when the same load waveform of the press load is detected a plurality of times, the reference waveform is generated based on the same load waveform, and therefore, the reference waveform with high reliability can be generated and the state of press working can be determined by the simple method.

A press system according to an aspect includes: a detection unit configured to detect a press load applied for pressing a workpiece; a storage unit configured to store a load waveform of the detected press load; a setting unit configured to set a representative load waveform of the press load based on a plurality of load waveforms of press loads stored in a predetermined period; and a display unit configured to indicate the representative load waveform of the press load that is set by the setting unit. The representative load waveform of the press load in a predetermined period is indicated, and therefore, the state of press working in the predetermined period can be determined by the simple method.

Preferably, the display unit is configured to superimpose and indicate respective representative load waveforms of press loads that are set by the setting unit for respective predetermined periods different from one another in time. Based on change of the representative load waveform of the press load, the state of press working can be determined by the simple method.

Preferably, the representative load waveform of the press load is an average waveform of the plurality of load waveforms of press loads in the predetermined period, and the predetermined period is set to one month. Based on change of the average load waveform of the press load for each month, the state of press working can be determined by the simple method.

A control method for a press system according to an aspect includes: detecting a press load applied for pressing a workpiece; storing a load waveform of the detected press load; setting a representative load waveform of the press load based on a plurality of load waveforms of press loads stored in a predetermined period; and indicating the set representative load waveform of the press load. The representative load waveform of the press load in a predetermined period is indicated, and therefore, the state of press working in the predetermined period can be determined by the simple method.

Preferably, the indicating includes superimposing and indicating respective representative load waveforms of press loads that are set for respective predetermined periods different from one another in time. Based on change of the representative load waveform of the press load, the state of press working can be determined by the simple method.

Preferably, the representative load waveform of the press load is an average waveform of the plurality of load waveforms of press loads in the predetermined period, and the predetermined period is set to one month. Based on change of the average load waveform of the press load for each month, the state of press working can be determined by the simple method.

Advantageous Effects of Invention

The press system of the present invention generates a reference waveform and thus the state of press working can be determined by a simple method.

DESCRIPTION OF EMBODIMENTS

Figure 1:
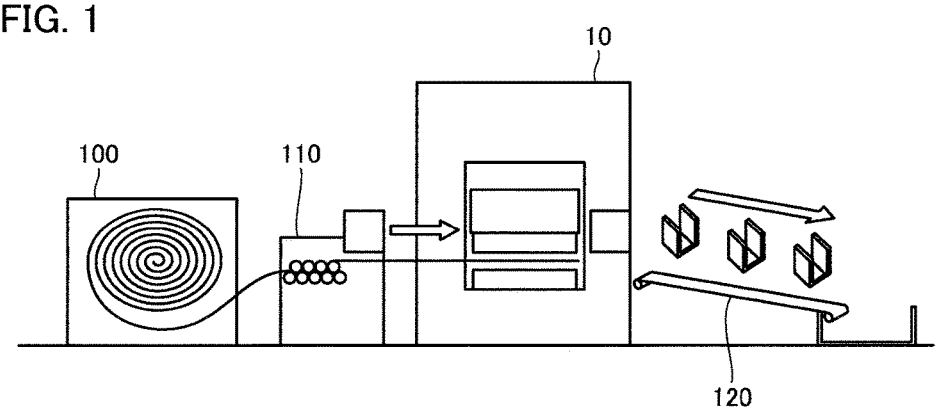
FIG. 1 is a diagram illustrating a configuration of a press system according to a first embodiment.

Embodiments will be described in detail with reference to the drawings. In the drawings, the same or corresponding parts are denoted by the same reference characters, and a description thereof will not be repeated.

In the present example, a progressive-type press machine will be described as an example of the press machine.

First Embodiment

<Overall Configuration>

FIG. 1 is a diagram illustrating a configuration of a press system according to a first embodiment.

As shown in FIG. 1, the press system includes a coil holder 100, a leveler feeder 110, a press machine 10, and a transport conveyer 120.

A coil is wound around coil holder 100, and the coil is transported through leveler feeder 110 to press machine 10. In the present example, press working for the coil as a workpiece (material) will be described.

Leveler feeder 110 adjusts the feed height of the coil transported from coil holder 100 to press machine 10, and also transports the coil to press machine 10 at a predetermined timing.

Press machine 10 presses the coil transported from leveler feeder 110 in accordance with a machining pattern that meets selected forming conditions.

Transport conveyer 120 transports a workpiece formed by pressing with press machine 10. For example, transport conveyer 120 may also transport the workpiece to a subsequent press machine.

The parts of the press system are synchronized with one another, and a series of operations is successively performed. The coil is transported from coil holder 100 to press machine 10 through leveler feeder 110. The workpiece pressed by press machine 10 is transported by transport conveyer 120. The above-described series of operations is repeated.

The above configuration of the press system is given by way of example, and the configuration of the press system is not limited to this.

<Press Machine>

Figure 2:
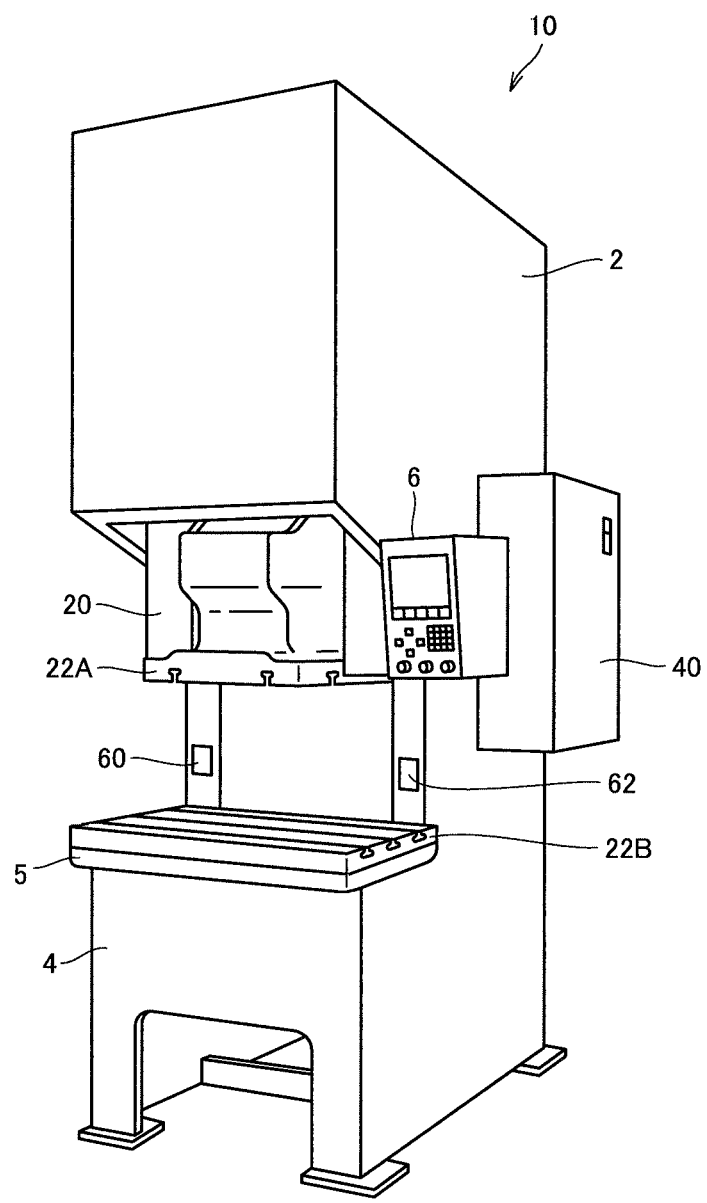
FIG. 2 is a perspective view of a press machine 10 according to the first embodiment.

FIG. 2 is a perspective view of press machine 10 according to the first embodiment.

As shown in FIG. 2, the press machine of the progressive type equipped with no plunger is illustrated by way of example.

Press machine 10 includes a body frame 2, a slide 20, a bed 4, a bolster 5, a control panel 6, and a controller 40.

At a substantially central position of body frame 2 of servo press 1, slide 20 is supported to be movable up and down. Below slide 20, bolster 5 attached on bed 4 is disposed. At a front portion of body frame 2, control panel 6 is disposed. On a lateral side of body frame 2, controller 40 to which control panel 6 is connected is disposed.

On the lower surface of slide 20, an upper die 22A of a die set is detachably mounted. On the upper surface of bolster 5, a lower die 22B of the die set is detachably mounted for machining a workpiece. A given workpiece to be pressed by the dies is positioned on lower die 22B and upper die 22A is lowered with slide 20 to press the workpiece.

Press machine 10 is equipped with a right load sensor 60 for the right side of body frame 2, and a left load sensor 62 for the left side of body frame 2. Strain gauge, pressure oil sensor, or the like may be used as the load sensor. The load sensor can be disposed at a proper position appropriately by those skilled in the art.

Control panel 6 is used for entering various types of data necessary for controlling press machine 10, and includes switches and ten keys for entering data as well as a display for indicating a settings screen and data which is output from press machine 10.

As the display, a programmable display having a clear touch switch panel mounted on the front face of a graphic display such as liquid crystal display or plasma display is used.

Control panel 6 may also include a data input device for data from an external storage medium such as IC card on which data set in advance is stored, or include a communication device for transmitting/receiving data in the wireless manner or through a communication line.

By means of control panel 6 in the first embodiment, settings for registration of a reference waveform used for determining a load waveform of a press load can be made, as described later herein.

The above configuration of the press machine is given by way of example, and the configuration of the press machine is not limited to the above configuration.

<Configuration of Controller of Press Machine 10>

Next, the controller of press machine 10 will be described.

Figure 3:
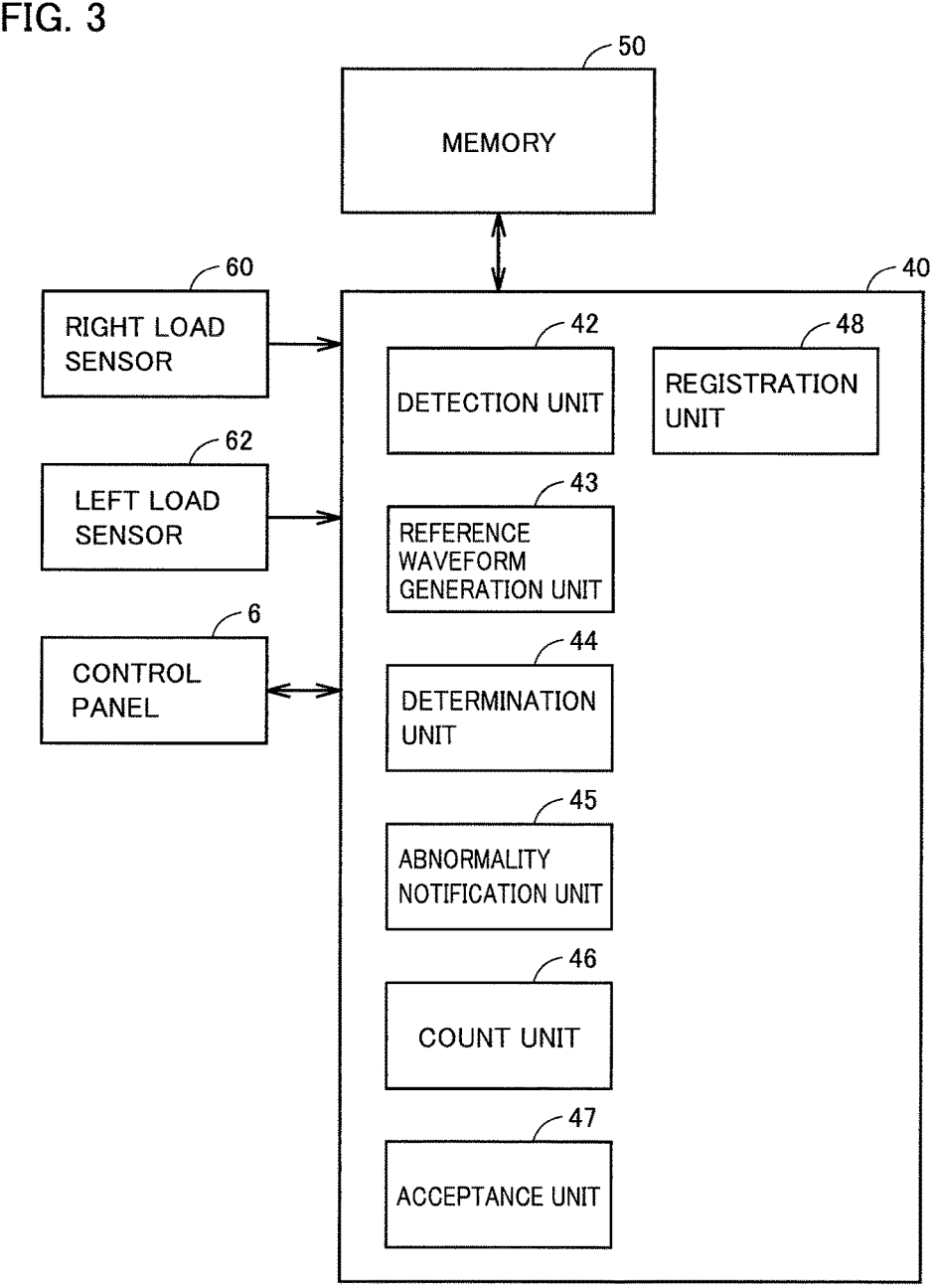
FIG. 3 is a block diagram illustrating a functional configuration and peripheral circuitry of a controller 40 according to the first embodiment.

FIG. 3 is a block diagram illustrating a functional configuration and peripheral circuitry of controller 40 according to the first embodiment.

Referring to FIG. 3, controller 40 according to the first embodiment controls the whole of press machine 10. While illustration of details in the drawing and description thereof of controller 40 are not given herein, controller 40 is configured to include a CPU, a high-speed arithmetic operation processor or the like as a main device, and configured to also include a computer device performing an arithmetic/logical operation on input data in accordance with a predetermined procedure, and an input/output interface for input/output of command current.

Controller 40 according to the first embodiment includes a detection unit 42, a reference waveform generation unit 43, a determination unit 44, an abnormality notification unit 45, a count unit 46, an acceptance unit 47, and a registration unit 48.

Controller 40 is connected to a memory 50 configured as an appropriate storage medium such as ROM or RAM. In memory 50, a program(s) for controller 40 to implement various functions is(are) stored. Memory 50 is also used as a work area for execution of various arithmetic operations.

In addition to control panel 6, load sensors (right load sensor 60, left load sensor 62) are connected to controller 40. With the load sensors, controller 40 can determine the state of the press load applied by slide 20.

Detection unit 42 receives input of data from right load sensor 60 and left load sensor 62 to detect a press load applied for press working. Detection unit 42 may also receive and detect an externally given instruction to execute a predetermined process. For example, detection unit 42 may receive an instruction to stop press activation to cause press working to stop.

Reference waveform generation unit 43 generates a reference waveform for comparison to be made for detecting a press abnormality as described later herein.

Determination unit 44 determines whether a press abnormality is present, based on the reference waveform generated by reference waveform generation unit 43 and the waveform of the press load detected by detection unit 42.

Abnormality notification unit 45 provides notification of an abnormality based on the result of determination by determination unit 44.

Count unit 46 includes a plurality of counters, and counts the number of times press working is performed, in accordance with the result of determination by determination unit 44, for example. Count unit 46 also counts the number of times the load waveform of the press load is identical to the reference waveform for comparison based on the result of determination by reference waveform generation unit 43.

Acceptance unit 47 accepts various inputs through control panel 6.

Registration unit 48 registers, in memory 50, the counter value based on the result of determination by determination unit 44 and a read waveform associated with the counter value. Registration unit 48 also registers, in memory 50, the reference waveform generated by reference waveform generation unit 43.

Figure 4:
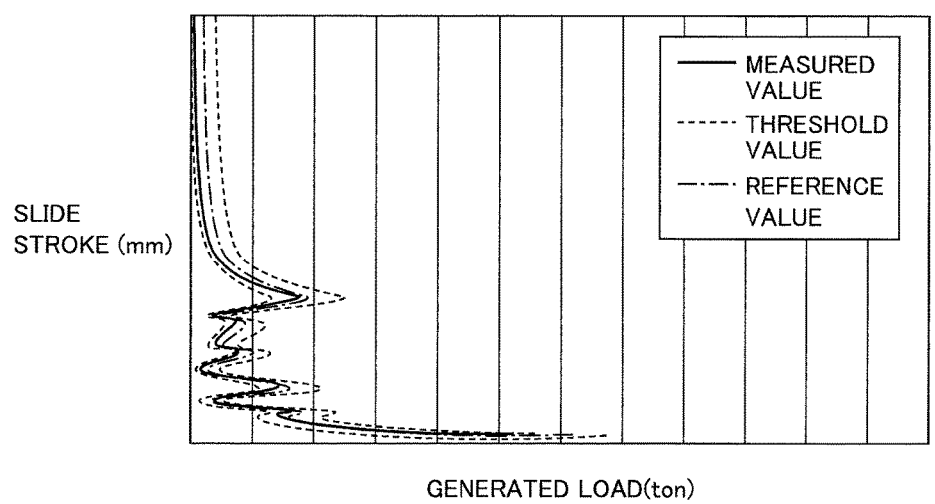
FIG. 4 is a diagram illustrating a method for determining whether an abnormality of a press load is present according to the first embodiment.

FIG. 4 is a diagram illustrating a method for determining whether an abnormality of a press load is present according to the first embodiment.

As shown in FIG. 4, an actually measured value, a reference value, and a threshold value are plotted.

The measured value is indicated by a solid line. By way of example, the measured value is shown as the total load of respective loads detected by right load sensor 60 and left load sensor 62.

The threshold value is determined based on the reference value and set to a value (upper limit, lower limit) having a predetermined margin with respect to the reference value.

In the present example, it is determined that the measured value falling in a predetermined range between the upper limit and the lower limit of the threshold value is a normal value. In contrast, it is determined that the measured value outside the predetermined range between the upper limit and the lower limit of the threshold value is an abnormal value.

In the present example, the measured value within the predetermined range is shown. In other words, the press load is a normal load.

A method for generating a reference value, namely a reference waveform to be compared with the measured value is now described according to the first embodiment.

Figure 5:
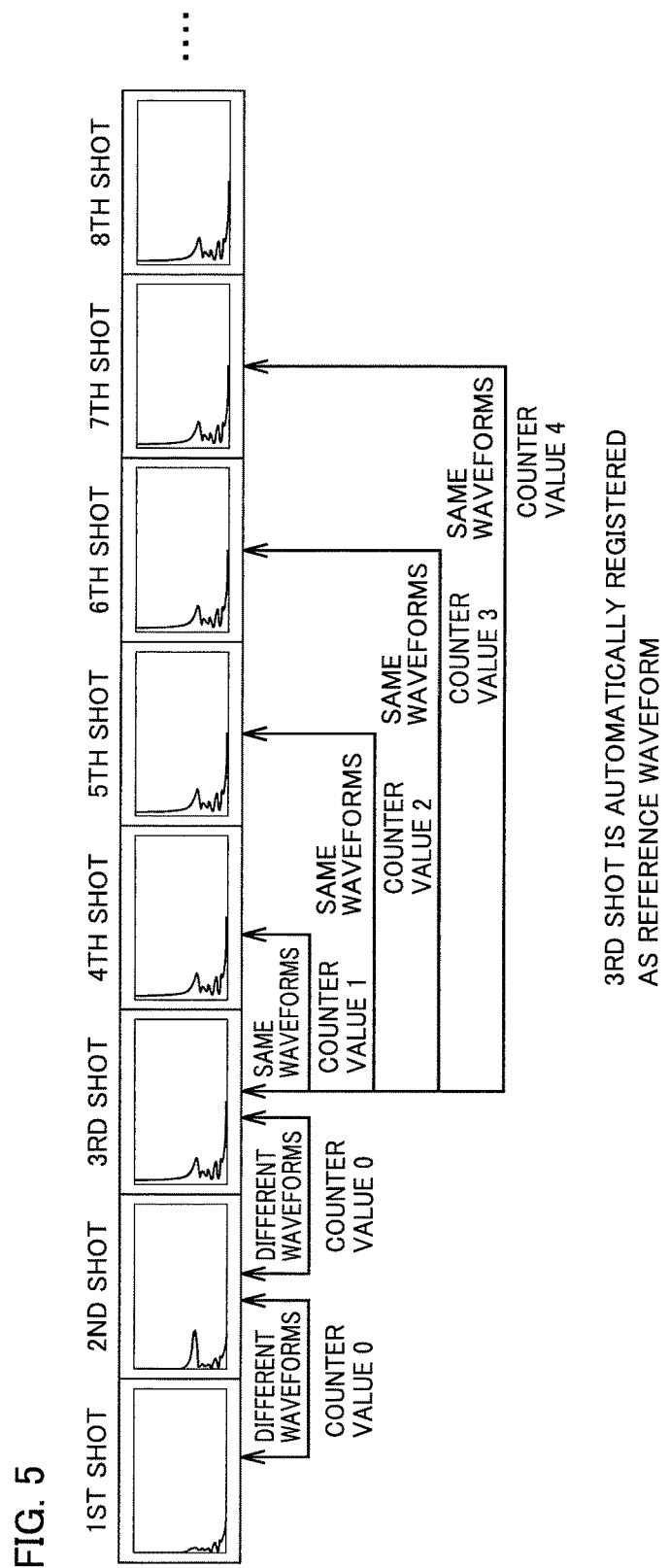
FIG. 5 is a diagram illustrating generation of a reference waveform according to the first embodiment.

FIG. 5 is a diagram illustrating generation of a reference waveform according to the first embodiment.

Referring to FIG. 5, respective load waveforms of press loads from the first shot to the eighth shot are shown.

At the first shot, a load waveform of an initially applied press load is shown.

At the second shot, it is determined whether the load waveform of the press load is identical to the load waveform of the first shot. The waveforms as shown are not the same waveforms (different waveforms).

At the third shot, it is determined whether the load waveform of the press load is identical to the load waveform of the second shot. The waveforms as shown are not the same waveforms.

At the fourth shot, it is determined whether the load waveform of the press load is identical to the load waveform of the third shot. The waveforms as shown are identical to each other (same waveforms).

At the fifth shot, it is determined whether the load waveform of the press load is identical to the load waveform of the third shot. The waveforms as shown are identical to each other.

At the sixth shot, it is determined whether the load waveform of the press load is identical to the load waveform of the third shot. The waveforms as shown are identical to each other.

At the seventh shot, it is determined whether the load waveform of the press load is identical to the load waveform of the third shot. The waveforms as shown are identical to each other.

At the seventh shot (at the fourth shot from the shot at which the waveform is identified as identical), the load waveform of the third shot is automatically registered as a reference waveform.

After the seventh shot, comparison with the automatically registered reference waveform is made.

Specifically, at the eighth shot, it is determined whether the load waveform of the press load is identical to the reference waveform (load waveform of the third shot). The waveforms as shown are identical to each other.

After the eighth shot, the determination is made in the same manner.

In the present example, the load waveform of the current shot is compared with the load waveform of the immediately preceding shot. When these waveforms are identical to each other, the load waveform of the next shot is compared with the load waveform of the aforementioned immediately preceding shot, and so on. In the present example, at the subsequent shots from the fourth shot, a comparison with the load waveform of the third shot is made.

In the first embodiment, when detection unit 42 detects the same load waveform of the press load a plurality of times, reference waveform generation unit 43 generates a reference waveform based on the detected same load waveform. In the present example, when the same waveform is detected four times, the waveform (load waveform of the third short) compared with the detected waveform is generated as a reference waveform. Registration unit 48 registers, in memory 50, the reference waveform generated by reference waveform generation unit 43.

The same waveforms are not limited to waveforms completely identical to each other, but include a waveform as a reference waveform and another waveform falling in a range of a predetermined width with respect to the reference waveform.

When the same load waveform of the press load is detected a plurality of times, reference waveform generation unit 43 automatically generates a reference waveform. Registration unit 48 registers the reference waveform generated by reference waveform generation unit 43, and therefore, the state of press working can be determined by the simple method.

The above description of the present example is of the case where the reference waveform is generated when the same waveform is detected four times. The number of times is merely an example, and can be set to a proper value appropriately by those skilled in the art depending on the quality precision of press working. For example, when high-quality press working is required, a larger number of times may be applied and, when high-quality press working is not required, a smaller number of times may be applied. For example, the reference waveform may be generated at the first shot. As press machine 10 generates the reference waveform, the state of press working can be determined by the simple method.

While the above description of the present example is of the case where the reference waveform is generated when the same load waveform of the press load is successively detected a plurality of times, based on the detected waveform, the same waveform may not necessarily be detected successively. Namely, when the same waveform is detected a plurality of times, the reference waveform may be automatically generated.

The above description of the present example is also of the case where the load waveform (load waveform of the third shot) with which the detected load waveform is compared and identified as the same waveform multiple times is used directly as the reference waveform. The manner of generating the reference waveform is not limited to this and, when the detected waveform is identified as the same waveform a plurality of times, an average value of the detected waveforms may be calculated and generated as the reference waveform.

Press machine 10 in the first embodiment generates the reference waveform based on the load waveforms obtained from actual press working, namely generates the reference waveform by acquiring load waveforms depending on the actual conditions of press machine 10 and the workpiece. The reference waveform can therefore be defined with high precision appropriate for the actual machine.

In contrast, if a load waveform of a given quality is registered like the conventional method, specifically a load waveform derived from a simulation for example is used as the reference waveform, an error may be generated depending on each machine or workpiece condition, for example. In this case, an increased allowance has to be given to the reference waveform for determining whether the waveform is normal or abnormal. If the allowance is increased, there is a possibility that determination with high precision is difficult to make. The method according to the first embodiment can thus define a high-precision reference waveform appropriate for the actual machine.

The load waveform varies widely depending on the type of the workpiece and the type of the die. The load waveform further varies depending on the condition of the press machine. A large memory capacity is therefore required for registering the reference waveforms in memory in advance, and adaptation to change with time of the press machine is impossible. The method in the first embodiment generates the reference waveform based on load waveforms using the actual workpiece and dies, and therefore is not required to store data in advance. The method also generates the reference waveform depending on the condition of the actual machine, and can therefore define a high-precision reference waveform adaptable to changes with time of the press machine.

Figure 6:
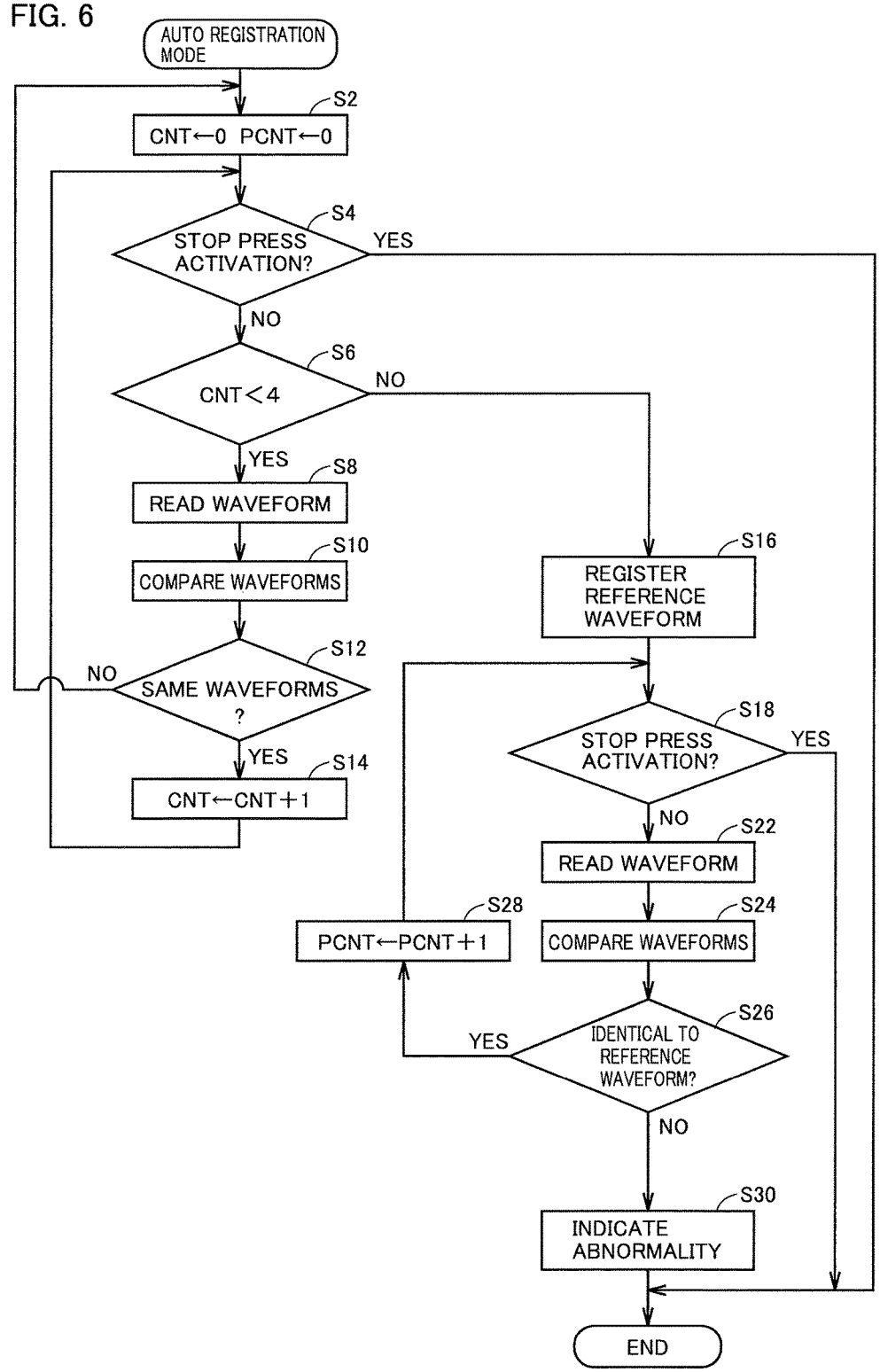
FIG. 6 is a flow diagram illustrating a pressing process in an automatic registration mode of press machine 10 according to the first embodiment.

FIG. 6 is a flow diagram illustrating a pressing process in an automatic registration mode of press machine 10 according to the first embodiment.

As shown in FIG. 6, press machine 10 resets counter values. Specifically, press machine 10 sets counter values CNT and PCNT to zero (step S2). The counters are included in count unit 46. Count unit 46 resets counter values CNT and PCNT to zero. Counter value CNT is used as a counter value representing the result of determination by reference waveform generation unit 43. Counter value PCNT is used as a counter value representing the result of determination by determination unit 44. Although the description of the present example is of the case where count unit 46 includes a plurality of counters, count unit 46 may be implemented by a single counter. Next, press machine 10 determines whether an instruction to stop press activation has been given (step S4). Detection unit 42 determines whether it has accepted the instruction to stop press activation.

When the instruction to stop press activation has been given in step S4 (YES in step S4), press machine 10 ends the process (END). When the instruction to stop press activation has been accepted, detection unit 42 ends press activation.

In contrast, when the instruction to stop press activation has not been given in step S4 (NO in step S4), press machine 10 continues the process. When the instruction to stop press activation has not been accepted, detection unit 42 instructs reference waveform generation unit 43 to generate a reference waveform following a predetermined condition.

Next, press machine 10 determines whether counter value CNT is less than 4 (step S6). Checking counter value CNT of the counter, reference waveform generation unit 43 determines whether counter value CNT is less than 4.

When press machine 10 determines in step S6 that counter value CNT is less than 4 (YES in step S6), press machine 10 performs waveform reading (step S8). When reference waveform generation unit 43 determines that counter value CNT of the counter is less than 4, reference waveform generation unit 43 reads the load waveform of the press load obtained by the load sensor and detected by detection unit 42.

Next, press machine 10 compares the read waveform with a waveform to be compared with the read waveform (step S10). When reference waveform generation unit 43 determines that counter value CNT of the counter is less than 4, reference waveform generation unit 43 compares the load waveform of the press load obtained from the load sensor and detected by detection unit 42 with the waveform to be compared therewith.

Next, press machine 10 determines whether the read waveform is identical to the waveform compared therewith (step S12). Reference waveform generation unit 43 determines whether the load waveform of the press load detected by detection unit 42 is identical to the waveform compared therewith. The waveform to be compared with the load waveform is defined as the latest load waveform of the press load with counter value CNT of 0. For example, in the example in FIG. 5, for the shots up to the fourth shot, the waveform to be compared with the detected waveform is the waveform of the shot immediately before the current shot. For the shots from the fifth shot, the waveform to be compared with the detected waveform is the load waveform of the third shot which is the latest waveform with counter value CNT of 0.

When press machine 10 determines in step S12 that the read waveform is identical to the waveform compared therewith (YES in step S12), press machine 10 increments counter value CNT (step S14). Specifically, reference waveform generation unit 43 instructs count unit 46 to add 1 to counter value CNT. Registration unit 48 registers, in memory 50, counter value CNT based on the result of determination and the read waveform associated with the counter value. In the case of counter value CNT of 0 as well, the read waveform and counter value CNT associated with the read waveform are registered in memory 50.

Then, the process of press machine 10 returns to step S4.

In contrast, when press machine 10 determines in step S12 that the read waveform and the waveform compared therewith are not identical to each other (NO in step S12), it returns to step S2 to reset counter value CNT (to "0"). Reference waveform generation unit 43 resets counter value CNT (to "0").

Registration unit 48 registers, in memory 50, counter value CNT based on the result of determination and the read waveform associated with the counter value. In the case of counter value CNT of 0 as well, the read waveform and the counter value associated with the read waveform are registered in memory 50.

In contrast, when press machine 10 determines in step S6 that counter value CNT is not less than 4, namely counter value CNT is 4 or more (NO in step S6), press machine 10 registers a reference waveform (step S16). When counter value CNT is 4 or more, reference waveform generation unit 43 registers the waveform compared with the detected waveform (latest waveform with counter value 0) as the reference waveform. Press machine 10 thereafter determines whether the press load is an abnormal load or not based on the reference waveform. Registration unit 48 registers in memory 50 the reference waveform generated by reference waveform generation unit 43. While the description of the present example of the method for determining whether to register the reference waveform based on whether counter value CNT is less than 4, the numerical value is not particularly limited (to "4") but may be changed as appropriate by those skilled in the art.

In step S18, press machine 10 determines whether an instruction to stop press activation has been given (step S18). Detection unit 42 determines whether the instruction to stop press activation has been received.

When the instruction to stop press activation has been received in step S18 (YES in step S18), press machine 10 ends the process (END). When the instruction to stop press activation has been received, detection unit 42 stops press activation.

In contrast, when the instruction to stop press activation has not been given in step S18 (NO in step S18), press machine 10 continues the process. When the instruction to stop press activation has not been received, detection unit 42 instructs determination unit 44 to compare the registered reference waveform with the load waveform of the press load.

Next, press machine 10 performs waveform reading (step S22). Determination unit 44 reads the load waveform of the press load obtained from the load sensor and detected by detection unit 42.

Next, press machine 10 compares the read waveform with the waveform to be compared therewith (step S24). Determination unit 44 compares the load waveform of the press load obtained from the load sensor and detected by detection unit 42 with the waveform (reference waveform) to be compared therewith.

Next, press machine 10 determines whether the read waveform is identical to the reference waveform (step S26). Determination unit 44 determines whether the load waveform of the press load detected by detection unit 42 is identical to the reference waveform.

When press machine 10 determines in step S26 that the read waveform is identical to the reference waveform (YES in step S26), press machine 10 increments counter value PCNT (step S28). Specifically, determination unit 44 instructs count unit 46 to add 1 to counter value PCNT.

Then, the process of press machine 10 returns to step S18 and the above-described steps are repeated.

In contrast, when press machine 10 determines in step S26 that the detected waveform is not identical to the reference waveform (NO in step S26), press machine 10 indicates the abnormality (step S30). Specifically, determination unit 44 gives an instruction to abnormality notification unit 45, and abnormality notification unit 45 causes the abnormality to be indicated on the display of control panel 6.

Then, the process is ended (END). Press machine 10 stops the press working.

This process enables press machine 10 to determine whether the press load is an abnormal press load based on the comparison of the load waveform of the press load obtained from the load sensor with the reference waveform and provide notification.

From counter value PCNT of count unit 46, information about the number of times the press load is identified as normal can be obtained. This information (the number of normal shots) can also be obtained by adding, to counter value PCNT, counter value CNT ("4" for example) which is the number of times reference waveform generation unit 43 determines that the detected waveform is identical to the reference waveform compared therewith. In terms of the waveform, five waveforms are identical to one another. Then, counter value CNT+1 ("5" for example) may be added to counter value PCNT to obtain the information (number of normal shots).

While the description of the present example is of the case where press working is stopped when the abnormality is detected, press working may not be stopped when the abnormality is detected. For example, after the abnormality is indicated on the display, the process may return to step S18. At this time, the number of shots when the abnormality is detected may be registered by registration unit 48 in memory 50. The number of shots when the abnormality is detected can be registered in memory 50 to easily detect when the abnormality occurs.

Second Embodiment

Regarding a second embodiment, another method for determining the state of press working is described.

Figure 7:
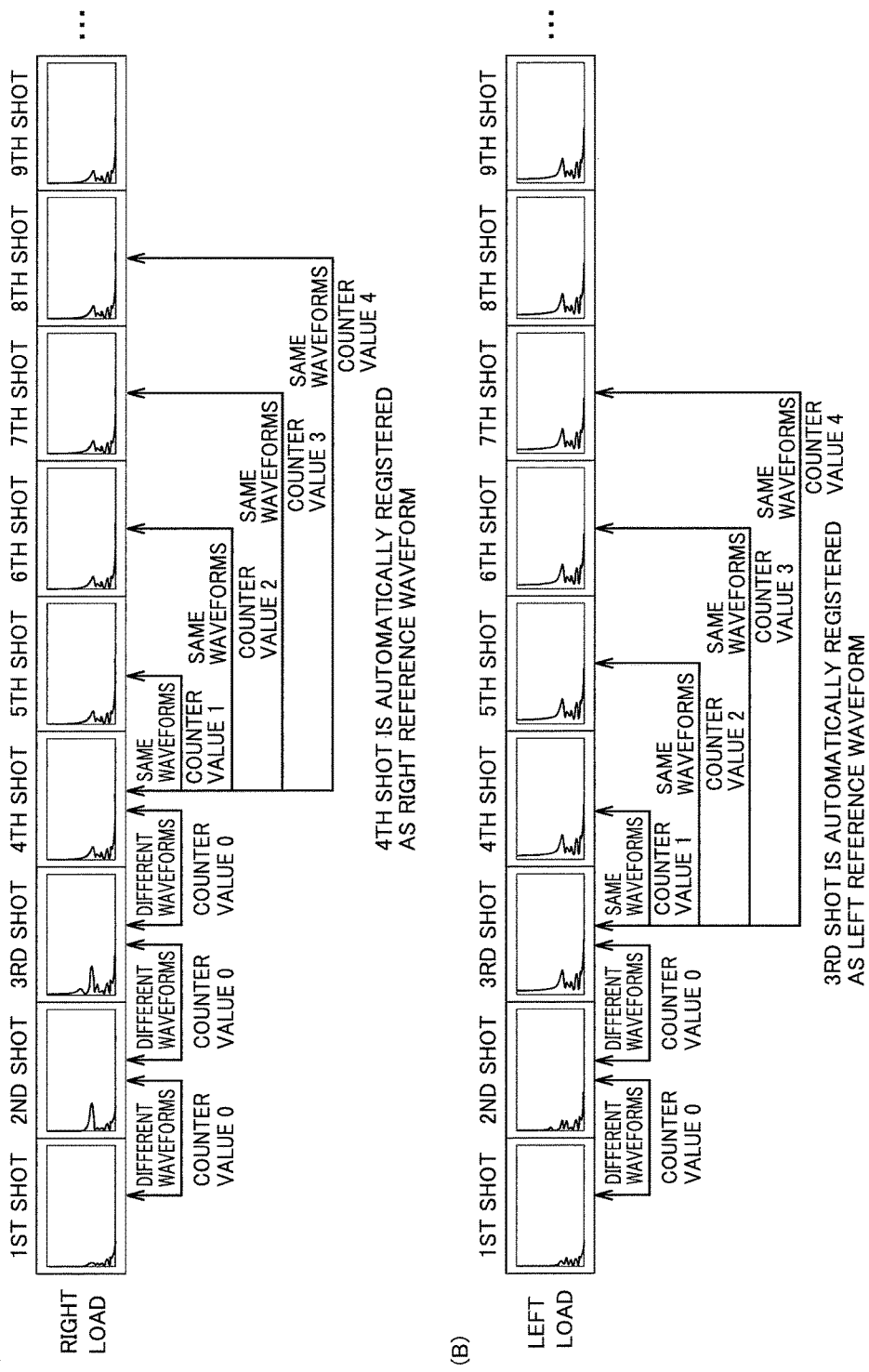
FIG. 7 is a diagram illustrating generation of a reference waveform according to a second embodiment.

FIG. 7 is a diagram illustrating generation of a reference waveform according to the second embodiment.

Referring to FIG. 7(A), regarding the right load, respective right load waveforms of press loads from the first shot to the ninth shot are shown.

At the first shot, a right load waveform of an initially applied press load is shown.

At the second shot, it is determined whether the right load waveform of the press load is identical to the right load waveform of the first shot. The waveforms as shown are not the same waveforms.

At the third shot, it is determined whether the right load waveform of the press load is identical to the right load waveform of the second shot. The waveforms as shown are not the same waveforms.

At the fourth shot, it is determined whether the right load waveform of the press load is identical to the right load waveform of the third shot. The waveforms as shown are not the same waveforms.

At the fifth shot, it is determined whether the right load waveform of the press load is identical to the right load waveform of the fourth shot. The waveforms as shown are the same waveforms.

At the sixth shot, it is determined whether the right load waveform of the press load is identical to the right load waveform of the fourth shot. The waveforms as shown are the same waveforms.

At the seventh shot, it is determined whether the right load waveform of the press load is identical to the right load waveform of the fourth shot. The waveforms as shown are the same waveforms.

At the eighth shot, it is determined whether the right load waveform of the press load is identical to the right load waveform of the fourth shot. The waveforms as shown are the same waveforms.

At the eighth shot (at the fourth shot from the shot at which the waveform is identified as identical), the right load waveform of the fourth shot is automatically registered as a reference waveform.

After the eighth shot, comparison with the automatically registered reference waveform is made.

Specifically, at the ninth shot, it is determined whether the right load waveform of the press load is identical to the reference waveform (load waveform of the fourth shot). After the ninth shot as well, the determination is made in the same manner.

In the present example, the right load waveform of the current shot is compared with the right load waveform of the immediately preceding shot. When these waveforms are identical to each other, the right load waveform of the next shot is compared with the right load waveform of the aforementioned immediately preceding shot, and so on. In the present example, at the subsequent shots from the fifth shot, a comparison with the load waveform of the fourth shot is made.

In the second embodiment, when detection unit 42 detects the same right load waveform of the press load a plurality of times, reference waveform generation unit 43 generates a reference waveform based on the aforementioned same right load waveform. In the present example, the same waveform as the right load waveform (right load waveform of the fourth shot) is detected four times, and the right load waveform of the fourth shot is generated as a reference waveform.

The same waveforms are not limited to waveforms completely identical to each other, but include a waveform as a reference waveform and another waveform falling in a range of a predetermined width with respect to the reference waveform.

Referring to FIG. 7(B), regarding the left load, respective left load waveforms of press loads from the first shot to the ninth shot are shown.

At the first shot, a left load waveform of an initially applied press load is shown.

At the second shot, it is determined whether the left load waveform of the press load is identical to the left load waveform of the first shot. The waveforms as shown are not the same waveforms.

At the third shot, it is determined whether the left load waveform of the press load is identical to the left load waveform of the second shot. The waveforms as shown are not the same waveforms.

At the fourth shot, it is determined whether the left load waveform of the press load is identical to the left load waveform of the third shot. The waveforms as shown are the same waveforms.

At the fifth shot, it is determined whether the left load waveform of the press load is identical to the left load waveform of the third shot. The waveforms as shown are the same waveforms.

At the sixth shot, it is determined whether the left load waveform of the press load is identical to the left load waveform of the third shot. The waveforms as shown are the same waveforms.

At the seventh shot, it is determined whether the left load waveform of the press load is identical to the left load waveform of the third shot. The waveforms as shown are the same waveforms.

At the seventh shot (at the fourth shot from the shot at which the waveform is identified as identical), the left load waveform of the third shot is automatically registered as a reference waveform.

After the seventh shot, comparison with the automatically registered reference waveform is made.

Specifically, at the eighth shot, it is determined whether the left load waveform of the press load is identical to the reference waveform (left load waveform of the third shot). At the subsequent ninth shot as well, the determination is made in the same manner.

In the present example, the left load waveform of the current shot is compared with the left load waveform of the immediately preceding shot. When these waveforms are identical to each other, the left load waveform of the next shot is compared with the left load waveform of the aforementioned immediately preceding shot, and so on. In the present example, at the subsequent shots from the fourth shot, a comparison with the load waveform of the third shot is made.

In the second embodiment, when detection unit 42 detects the same left load waveform of the press load a plurality of times, reference waveform generation unit 43 generates a reference waveform based on the aforementioned same left load waveform of the press load. In the present example, the same waveform as the left load waveform (left load waveform of the third shot) is detected four times, and the left load waveform of the third shot is generated as a reference waveform.

When the same load waveform of the press load is detected a plurality of times, reference waveform generation unit 43 automatically generates the reference waveform, and thus the reference waveform can be generated by the simple method. In the second embodiment, the right and left reference waveforms of the press loads can be generated.

The pressing process in the automatic registration mode described in connection with FIG. 6 is also applicable to press machine 10 in the second embodiment.

Specifically, when the same right load waveform of the press load is detected a plurality of times, the right load reference waveform is generated. When the same left load waveform of the press load is detected a plurality of times, the left load reference waveform is generated. Determination unit 44 determines whether the read waveform is identical to the reference waveform, based on the right and left load reference waveforms.

In the second embodiment, when a read right load waveform of the press load is identical to the right load reference waveform and a read left load waveform of the press load is identical to the left load reference waveform, it is determined that the same waveform as the reference waveform is detected.

In the second embodiment, therefore, both the left load waveform and the right load waveform of the press load are determined, and thus the abnormality of the press load can be determined with higher precision than the first embodiment.

While the description of the present example is of the method by which respective loads of two locations, namely a right location and a left location, are detected to determine whether the detected loads are each abnormal or not, the locations are not particularly limited to the two locations. Respective loads of multiple locations can be detected to determine whether the detected loads are each abnormal or not and thus enable an abnormality of the press load to be determined with higher precision.

From counter value PCNT of count unit 46, information about the number of times the press load is identified as normal can be obtained. This information (the number of normal shots) can also be obtained by adding, to counter value PCNT, counter value CNT ("4" for example) which is the number of times reference waveform generation unit 43 determines that the detected waveform is identical to the reference waveform compared therewith. In terms of the waveform, five waveforms are identical to one another. Then, counter value CNT+1 ("5" for example) may be added to counter value PCNT to obtain the information (number of normal shots).

Third Embodiment

Figure 8:
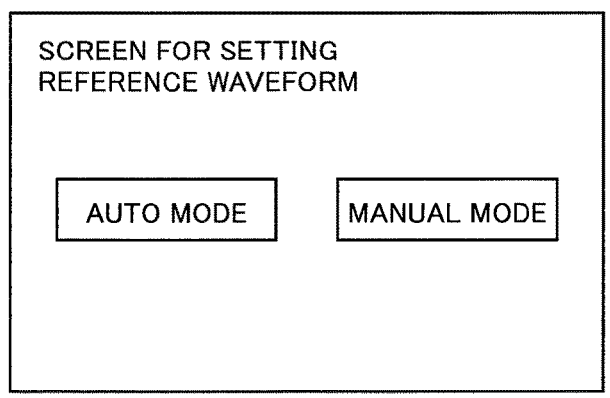
FIG. 8 is a diagram illustrating a selection screen according to a third embodiment.

FIG. 8 is a diagram illustrating a selection screen according to a third embodiment.

As shown in FIG. 8, the selection screen that allows selection of an automatic mode or a manual mode to be accepted in the third embodiment is shown.

In "automatic mode," a reference waveform is automatically generated when the same load waveform of the press load is detected a plurality of times.

In "manual mode," a reference waveform is generated in response to an instruction from a user.

When "automatic mode" is selected, the pressing process in the automatic registration mode illustrated in FIG. 6 is performed.

When "manual mode" is selected, a pressing process in the manual registration mode is performed as described below.

Figure 9:
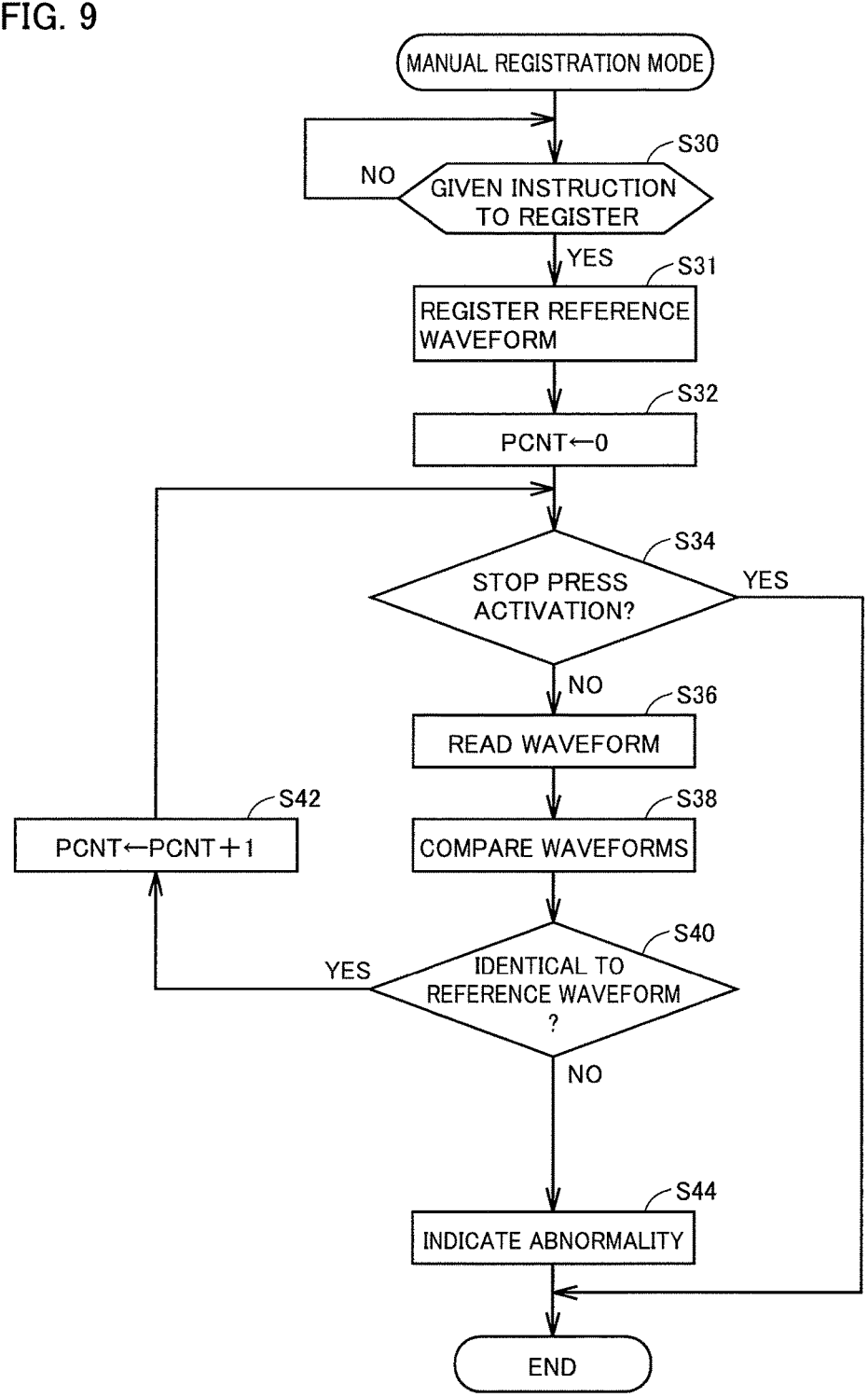
FIG. 9 is a flow diagram illustrating a pressing process in a manual registration mode according to the third embodiment.

FIG. 9 is a flow diagram illustrating a pressing process in the manual registration mode according to the third embodiment.

As shown in FIG. 9, press machine 10 determines whether an instruction to register has been given (step S30). Specifically, reference waveform generation unit 43 determines whether a user has pressed a predetermined button (not shown) of control panel 6. In the third embodiment, in response to selection of the manual registration mode, a load waveform of a press load is indicated on the display by way of example. Viewing the load waveform, the user operates a predetermined button upon determining that the load waveform is a waveform of a normal press load (manual registration).

When press machine 10 determines in step S30 that the instruction to register has been given (YES in step S30), a reference waveform is registered (step S31). Reference waveform generation unit 43 generates, as the reference waveform, the load waveform of the press load when a predetermined button is operated (manually operated). Registration unit 48 registers, in memory 50, the reference waveform generated by reference waveform generation unit 43.

Next, press machine 10 resets the counter value (step S32). Specifically, counter value PCNT is set to zero. The counter is included in count unit 46. Count unit 46 resets counter value PCNT to zero. Counter value PCNT is used as a counter value representing the result of determination by determination unit 44.

In step S32, press machine 10 determines whether an instruction to stop press activation has been given (step S34). Detection unit 42 determines whether the instruction to stop press activation has been accepted.

When press machine 10 determines in step S34 that the instruction to stop press activation has been given (YES in step S34), the process is ended (END). When the instruction to stop press activation has been accepted, detection unit 42 ends press activation.

In contrast, when press machine 10 determines in step S34 that the instruction to stop press activation has not been given (NO in step S34), the process is continued. When the instruction to stop press activation has not been accepted, detection unit 42 instructs determination unit 44 to give an instruction to compare the reference waveform registered for determination unit 44 with a load waveform of the press load.

Next, press machine 10 performs waveform reading (step S36). Determination unit 44 reads a load waveform of a press load obtained from the load sensor and detected by detection unit 42.

Next, press machine 10 compares the read waveform with the waveform to be compared with the read waveform (step S38). Determination unit 44 compares the load waveform of the press load obtained from the load sensor and detected by detection unit 42 with the waveform (reference waveform) to be compared.

Next, press machine 10 determines whether the read waveform is identical to the reference waveform (step S40). Determination unit 44 determines whether the load waveform of the press load detected by detection unit 42 is identical to the reference waveform.

When press machine 10 determines in step S40 that the read waveform is identical to the reference waveform (YES in step S40), press machine 10 increments counter value PCNT (step S42). Specifically, determination unit 44 instructs count unit 46 to add 1 to counter value PCNT.

The process for press machine 10 then returns to step S34 to repeat the above-described steps.

In contrast, when press machine 10 determines in step S40 that the waveform is not identical to the reference waveform (NO in step S40), an abnormality is indicated (step S44). Specifically, determination unit 44 gives an instruction to abnormality notification unit 45, and abnormality notification unit 45 causes the abnormality to be indicated on the display of control panel 6.

Then, the process is ended (END). Press machine 10 stops the press working.

This process enables press machine 10 to determine whether the press load is an abnormal press load based on the comparison of the load waveform of the press load obtained from the load sensor with the reference waveform and provide notification.

From counter value PCNT of count unit 46, information about the number of times the press load is identified as normal can be obtained.

This method enables the manual mode and the automatic mode to be switched to each other, and thus whether the press load is abnormal or not can be determined as intended by a user, and highly versatile press machine 10 can be implemented. Another mode may also be provided. For example, a semi-automatic mode may be provided. For example, when a user (manually) operates a predetermined button, the load waveform of the press load at this time may be defined as a temporary reference waveform and, when the same load waveform of the press load as the temporary reference waveform is identified a plurality of times, the actual reference waveform may be generated. This mode enhances the degree of freedom in generating a reference waveform, and thus enables abnormality determination of the press load as intended by a user.

Fourth Embodiment

Regarding a fourth embodiment, a description will be given of a process for an abnormality in the case where the reference waveform is not generated by reference waveform generation unit 43.

Figure 10:
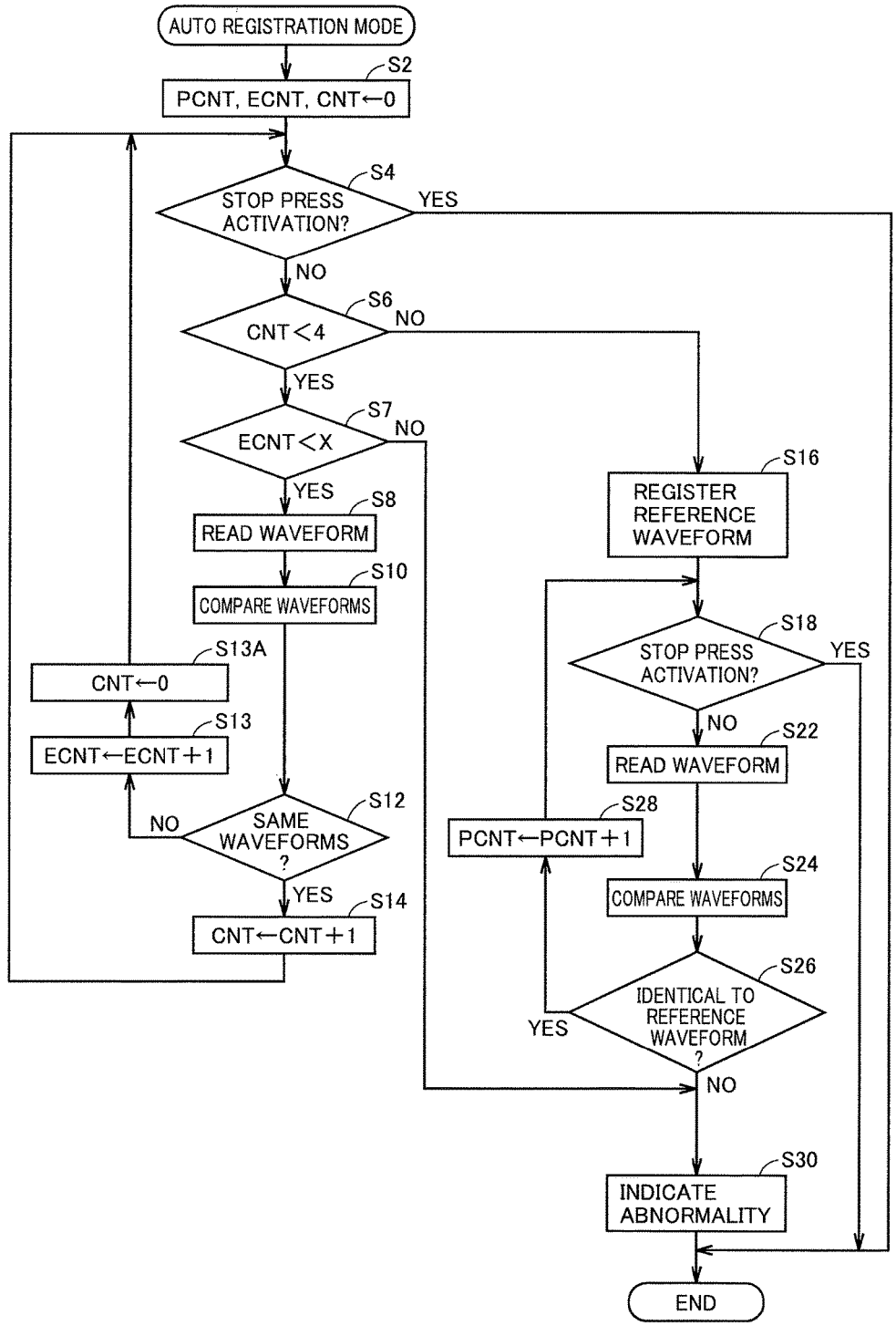
FIG. 10 is a flow diagram illustrating a pressing process in an automatic registration mode of a press machine 10 according to a fourth embodiment.

FIG. 10 is a flow diagram illustrating a pressing process in the automatic registration mode of press machine 10 according to the fourth embodiment.

Referring to FIG. 10, the flow diagram differs from the flow diagram in FIG. 6 in that the former additionally includes steps S7, S13, and S13A, and a counter value ECNT is included in the former flow diagram. Counter value ECNT is a counter value representing the number of times the same waveform is not identified as a result of determination by reference waveform generation unit 43.

In step S2, press machine 10 resets counter values. Specifically, press machine 10 sets counter values CNT, PCNT, and ECNT to zero (step S2).

Next, press machine 10 determines whether an instruction to stop press activation has been given (step S4). Detection unit 42 determines whether the instruction to stop press activation has been accepted.

When the instruction to stop press activation has been given in step S4 (YES in step S4), press machine 10 ends the process (END). When the instruction to stop press activation has been accepted, detection unit 42 ends press activation.

In contrast, when the instruction to stop press activation has not been given in step S4 (NO in step S4), press machine 10 continues the process. When the instruction to stop press activation has not been accepted, detection unit 42 instructs reference waveform generation unit 43 to generate a reference waveform following a predetermined condition.

Next, press machine 10 determines whether counter value CNT is less than 4 (step S6). Checking counter value CNT of the counter, reference waveform generation unit 43 determines whether counter value CNT is less than 4.

When press machine 10 determines in step S6 that counter value CNT is less than 4 (YES in step S6), press machine 10 determines whether counter value ECNT is less than X (step S7).

When press machine 10 determines in step S7 that counter value ECNT is less than X (YES in step S7), press machine 10 reads a waveform (step S8). When reference waveform generation unit 43 determines that counter value ECNT of the counter is less than X, reference waveform generation unit 43 reads the load waveform of the press load obtained by the load sensor and detected by detection unit 42.

In contrast, when press machine 10 determines in step S7 that counter value ECNT is not less than X (NO in step S7), press machine 10 indicates an abnormality (step S30). Specifically, reference waveform generation unit 43 instructs abnormality notification unit 45, and abnormality notification unit 45 causes the abnormality to be indicated on the display of control panel 6.

Following step S8, press machine 10 compares the read waveform with a waveform to be compared with the read waveform (step S10). When reference waveform generation unit 43 determines that counter value CNT of the counter is less than 4, reference waveform generation unit 43 compares the load waveform of the press load obtained from the load sensor and detected by detection unit 42 with the waveform to be compared therewith.

Next, press machine 10 determines whether the read waveform is identical to the waveform compared therewith (step S12). Reference waveform generation unit 43 determines whether the load waveform of the press load detected by detection unit 42 is identical to the waveform compared therewith. The waveform to be compared with the detected waveform is defined as the latest waveform with counter value CNT of 0. For example, in the example in FIG. 5, for the shots up to the fourth shot, the waveform to be compared with the detected waveform is the waveform of the shot immediately before the current shot. For the shots from the fifth shot, the waveform to be compared with the detected waveform is the load waveform of the third shot which is the latest waveform with counter value CNT of 0.

When press machine 10 determines in step S12 that the read waveform is identical to the waveform compared therewith (YES in step S12), press machine 10 increments counter value CNT (step S14). Specifically, reference waveform generation unit 43 instructs count unit 46 to add 1 to counter value CNT. Registration unit 48 registers, in memory 50, counter value CNT based on the result of determination and the read waveform associated with the counter value. In the case of counter value CNT of 0 as well, the read waveform and counter value CNT associated with the read waveform are registered in memory 50.

Then, the process of press machine 10 returns to step S4.

In contrast, when press machine 10 determines in step S 12 that the read waveform and the waveform compared therewith are not identical to each other (NO in step S12), press machine 10 increments counter value ECNT (step S13). Specifically, reference waveform generation unit 43 instructs count unit 46 to add 1 to counter value ECNT.

The process then proceeds to step S13A to reset counter value CNT (to "0"). Reference waveform generation unit 43 instructs count unit 46 to reset counter value CNT (to "0").

Then, the process of press machine 10 returns again to step S4.

When press machine 10 determines in step S6 that counter value CNT is not less than 4, namely counter value CNT is 4 or more (NO in step S6), press machine 10 registers a reference waveform (step S16). The subsequent steps are similar to those described in connection with FIG. 6, and the detailed description thereof is not repeated.

In this process, when reference waveform generation unit 43 determines that counter value ECNT is a predetermined number X, press machine 10 determines that an abnormality is present and indicates the abnormality on the display.

When reference waveform generation unit 43 determines that the read waveform and the waveform compared therewith are not identical to each other a predetermined number of times X, it determines that press machine 10 is kept in a state which is not a normal state. Then, abnormality notification unit 45 can be instructed to indicate the abnormality.

It can thus be determined appropriately that press machine 10 is in the abnormal state to notify (inform) a user of the abnormality.

As to the predetermined number of times X, if the press machine is of the transfer type and has a plurality of stations, X is set to a numerical value larger than the number of the stations.

If workpiece W is not placed in each station, the load waveform of the press load is not identified as normal and accordingly there is a high possibility that the load waveforms of the press loads corresponding to the number of stations are identified as abnormal waveforms.

While the above description is of the case where the system is applicable to the progressive-type press machine, the system is not particularly limited to this and the system is also applicable to the transfer-type press machine.

Figure 11:
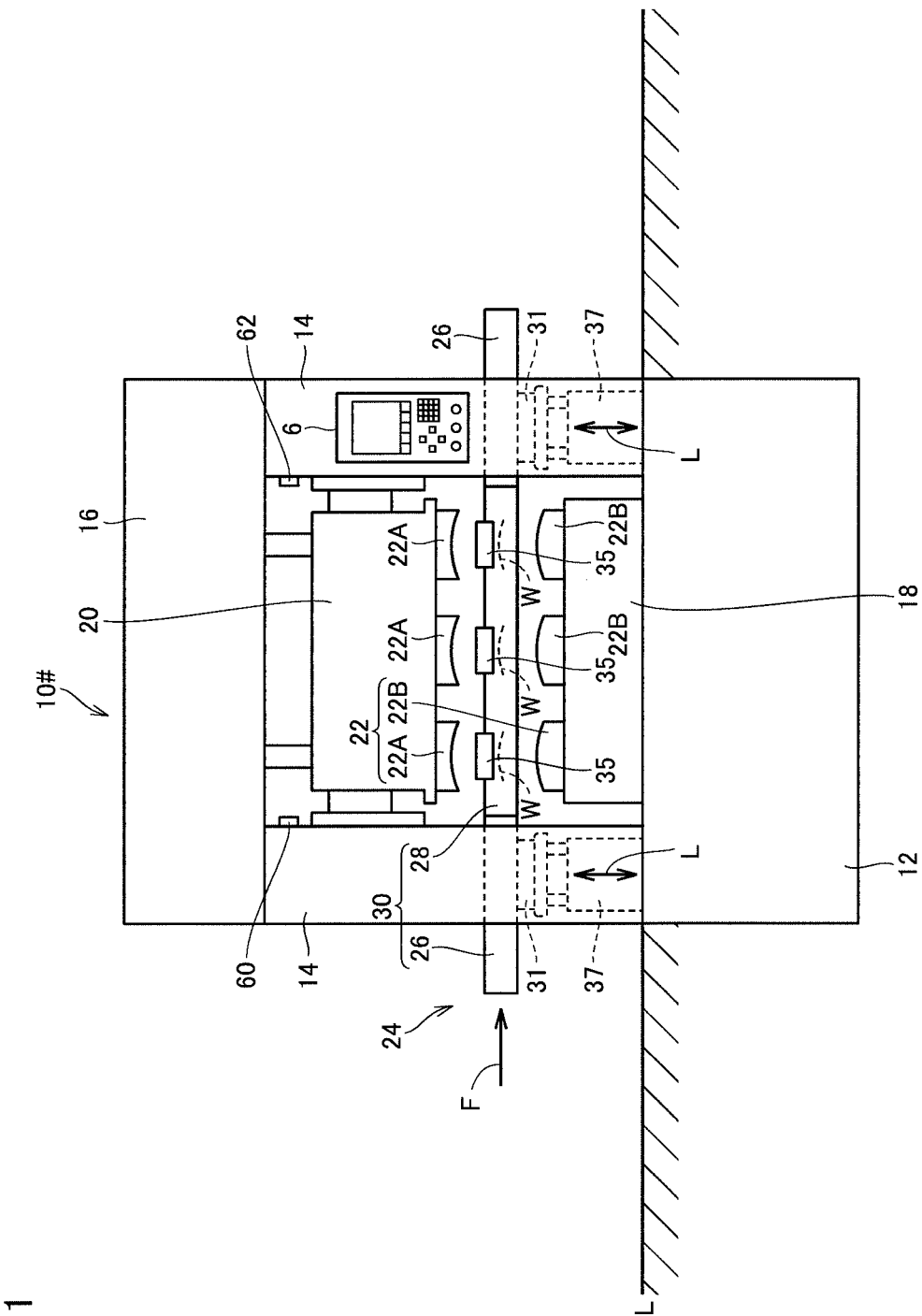
FIG. 11 is a diagram illustrating a press machine 10# that is a transfer-type press machine.

FIG. 11 is a diagram illustrating a press machine 10# that is a transfer-type press machine.

A front view is shown in this example.

As shown in FIG. 11, a bed 12 having a rectangular shape as seen in plan view is embedded under a floor FL. On four corners of bed 12 as seen in plan view, columnar uprights 14 are erected. On these four uprights, a crown 16 is supported. A slide 20 is suspended from crown 16, and an appropriate drive mechanism in crown 16 can drive slide 20 up and down. These parts form the body of the transfer-type press.

On bed 12, a moving bolster 18 is placed. Moving bolster 18 is configured to be transportable smoothly along appropriate guide means such as rail out of the press body or into the press body. On the upper surface of moving bolster 18, a lower die 22B of a die 22 is detachably mounted for machining a workpiece W.

On the lower surface of slide 20, an upper die 22A of die 22 is detachably mounted. A given workpiece W for die 22 is positioned on lower die 22B and upper die 22A is lowered together with slide 20 to press workpiece W.

Press machine 10# is equipped with a work transport device 24 for newly feeding workpiece W to be pressed or successively feeding workpiece W to the next station.

Work transport device 24 includes a long transfer bar 30 extended in parallel with the direction in which workpiece W is transported.

Workpiece W is transported from left to right and, in the direction orthogonal to this transport direction, namely the direction perpendicular to the plane of the drawing, a work holder 35 adapted to the type of workpiece W is detachably mounted on transfer bar 30.

Work transport device 24 including transfer bar 30 as its component has a feed drive mechanism 31 as a bar drive mechanism for which a linear motor is used, for example. Transfer bar 30 is thus driven in a feed direction F. It also has a lift-clamp drive mechanism 37. Transfer bar 30 is thus driven in each of a lift direction L and a clamp direction.

Work holder 35 is provided for each operation. Work transport device 24 is controlled to be driven such that transfer bar 30 is moved to follow a preset motion in the feed direction, the clamp direction, namely the horizontally orthogonal direction to the work feed direction, and the lift direction. Accordingly, workpiece W is transported successively to the next station and the press-formed workpiece W is transported to the outside.

In the present example, the number of stations for machining workpiece W is three by way of example. The number of stations can be changed appropriately depending on the manner of machining workpiece W.

Press machine 10 includes a right load sensor 60 for the right side of slide 20 and a left load sensor 62 for the left side of slide 20.

Control panel 6 is used for entering various types of data necessary for controlling press machine 10#, and includes switches and ten keys for entering data as well as a display for indicating a settings screen and data which is output from press machine 10#.

As the display, a programmable display having a clear touch switch panel mounted on the front face of a graphic display such as liquid crystal display or plasma display is used.

Control panel 6 may also include a data input device for data from an external storage medium such as IC card on which data set in advance is stored, or include a communication device for transmitting/receiving data in the wireless manner or through a communication line.

Further, this press machine may be used as an independent press machine, or used for tandem press line in which a plurality of press machines are successively arranged.

Fifth Embodiment

The foregoing description of the above embodiments is of the method for generating a reference waveform once by reference waveform generation unit 43. The method is not limited to this and the reference waveform may be generated by reference waveform generation unit 43 at predetermined intervals. For example, the intervals may be every month, and thus reference waveform may be generated by reference waveform generation unit 43 every month to determine whether an abnormality in press working is present. According to this method, the reference waveform is generated to adapt to change of dies with time. It is therefore possible to determine, by the simple method, the state of press working influenced by change with time.

Registration unit 48 may store, in memory 50, the reference waveforms generated by reference waveform generation unit 43 at predetermined intervals. The reference waveforms generated at predetermined intervals can be stored in memory 50 to analyze the state of press working based on change of the reference waveform with time. For example, the reference waveforms generated by reference waveform generation unit 43 at predetermined intervals may be displayed in such a manner that superimposes the reference waveforms on one another, so that change of the reference waveform can be easily indentified.

Figure 12:
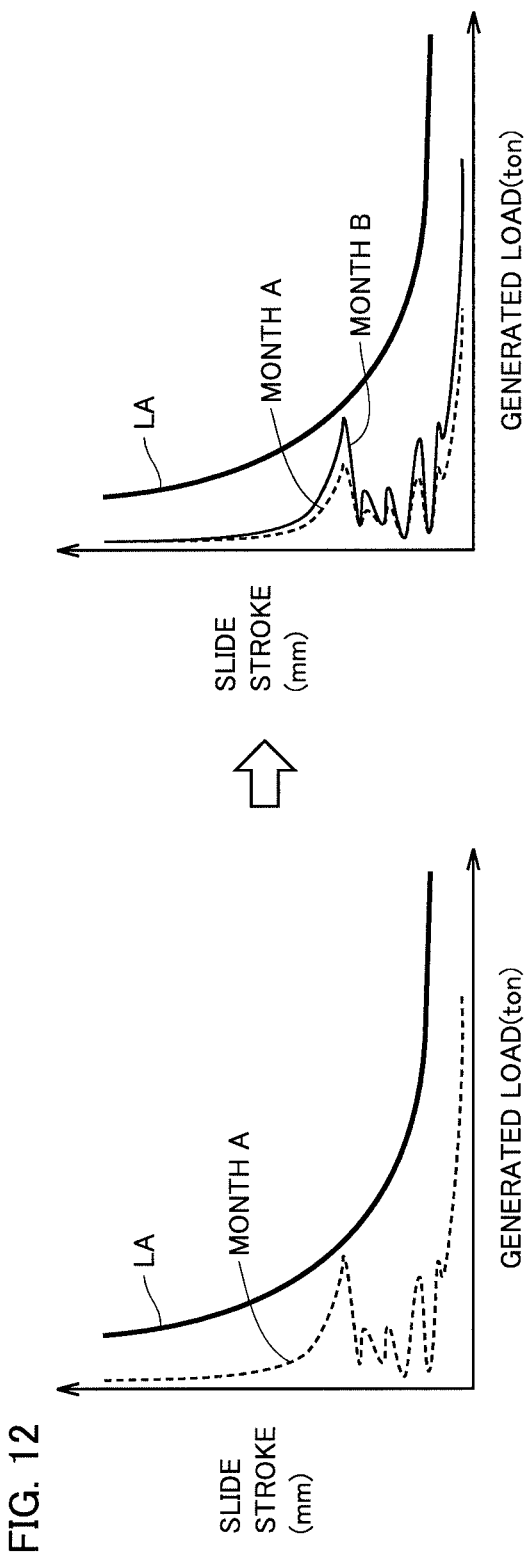
FIG. 12 is a diagram illustrating indication of a reference waveform according to a fifth embodiment.

FIG. 12 is a diagram illustrating indication of the reference waveform according to the fifth embodiment.

Referring to FIG. 12, reference waveforms generated at predetermined intervals (every month, for example), are shown. By way of example, a reference waveform generated in month A is shown. Curve LA is an acceptable load curve. A load exceeding curve LA may be identified as overload.

A reference waveform generated in the next month B by reference waveform generation unit 43 is also shown. The reference waveform is generated by reference waveform generation unit 43 and registered in memory 50.

In the present example, respective reference waveforms of month A and month B are superimposed on each other and compared with each other, and any change of the reference waveform can be thus identified. As an example of the change of waveform, the reference waveform changes so that its peak approaches curve LA. Based on this, the possibility that overload occurs in the future due to the change with time can be predicted. It is also possible to identify the degree of wear of the die or predict the maintenance intervals.

The above description of the present example is of the method according to which a reference waveform generated by reference waveform generation unit 43 is registered in memory 50 and the registered reference waveform is read from memory 50 and displayed. The waveform to be displayed is not limited to the reference waveform, and a load waveform of a press load applied for pressing a workpiece may be displayed.

Sixth Embodiment

Figure 13:
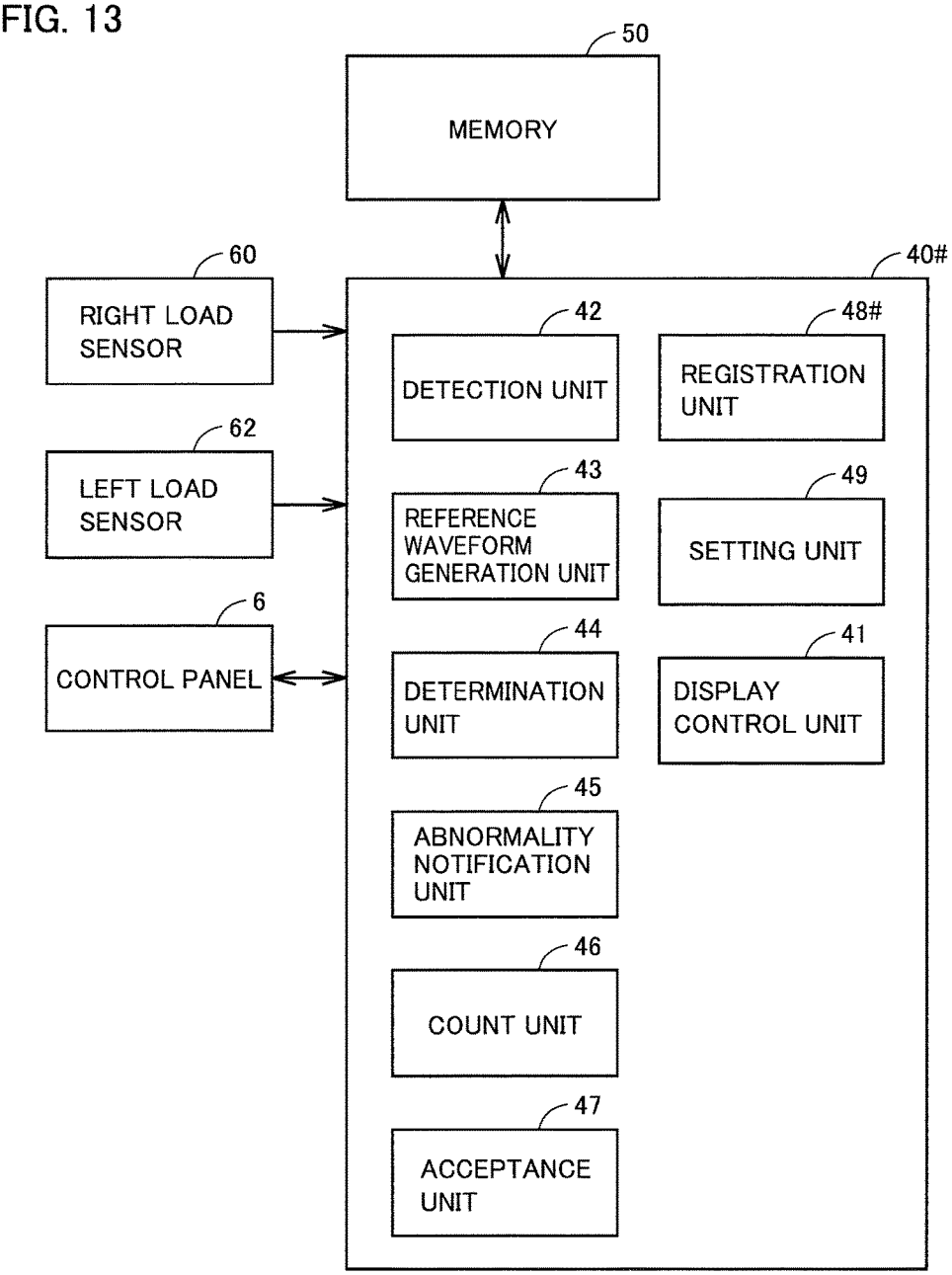
FIG. 13 is a block diagram illustrating a functional configuration and peripheral circuitry of a controller 40# according to a sixth embodiment.

FIG. 13 is a block diagram illustrating a functional configuration and peripheral circuitry of a controller 40# according to a sixth embodiment.

Referring to FIG. 13, controller 40# according to the sixth embodiment differs from controller 40 shown in FIG. 3 in that the former includes a registration unit 48# instead of registration unit 48 and additionally includes a display control unit 41 and a setting unit 49. Other features are similar to those described above in connection with FIG. 3, and the detailed description thereof is not repeated.

In contrast to registration unit 48, registration unit 48# registers, in memory 50, a load waveform of a press load detected by detection unit 42 during press working for a workpiece.

Setting unit 49 sets a representative press load waveform based on the press load waveforms stored in memory 50. Setting unit 49 sets a representative press load waveform to a press load waveform determined by calculating an average value of a plurality of press load waveforms registered in memory 50, for example.

Display control unit 41 indicates, on a display unit of control panel 6, the representative press load waveform set by setting unit 49. For example, an average value of press load waveforms for each month as shown in FIG. 12 may be indicated. By way of example, display control unit 41 may superimpose average values of monthly press load waveforms on the display unit. Accordingly, any monthly change of the load waveforms can be identified easily.

With this method, the possibility that the waveform changes with time in the future can be predicted. It is also possible to identify the degree of wear of the die or predict the maintenance intervals.

Figure 14:
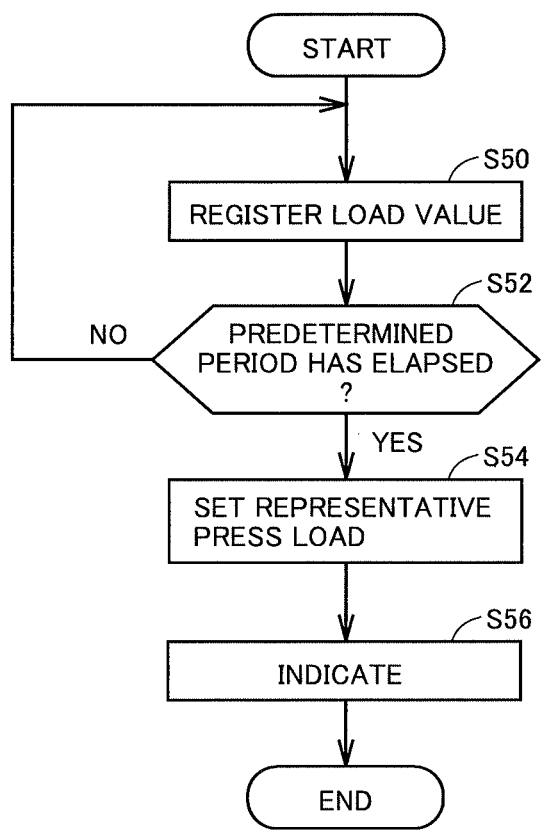
FIG. 14 is a flow diagram illustrating indication of a load waveform of a press load by controller 40# according to the sixth embodiment.

FIG. 14 is a flow diagram illustrating indication of a load waveform of a press load by controller 40# according to the sixth embodiment.

Referring to FIG. 14, controller 40# registers a load value (step S50). Specifically, registration unit 48# registers, in memory 50, a load waveform of a press load detected by detection unit 42.

Next, controller 40# determines whether a predetermined period has elapsed (step S52). By way of example, setting unit 49 determines whether one month, as the predetermined period, has elapsed.

When controller 40# determines that a predetermined period has elapsed (YES in step S52), controller 40# sets a representative press load waveform. Specifically, setting unit 49 reads press load waveforms registered in memory 50 in one month and calculates an average value of the plurality of press load waveforms. Then, it sets the representative press load waveform to the calculated average waveform. Registration unit 48# registers, in memory 50, the representative press load waveform set by setting unit 49.

When controller 40# determines that a predetermined period has not elapsed (NO in step S52), it returns to step S50 and registers, in memory 50, the load waveform of the press load until the predetermined period has elapsed.

Next, controller 40# indicates the representative press load waveform on the display unit (step S56). Display control unit 41 indicates, on the display unit, the representative press load waveform set by setting unit 49.

The process is accordingly ended (END).

Display control unit 41 may superimpose a representative press load waveform set by setting unit 49 in the past on the display unit.

In this way, any monthly change of the load waveform can be identified easily.

With this method, the possibility that the waveform changes with time in the future can be predicted. It is also possible to identify the degree of wear of the die or predict the maintenance intervals.

When press machine 10 is connected through a network to an external server and has a communication unit (not shown), data may be transmitted to the external server from press machine 10 through the communication unit. For example, data on the reference waveforms registered in memory 50 may be transmitted. Alternatively, data on the load waveforms of the press loads registered in memory 50 may be transmitted. The external server can store the data transmitted from press machine 10 to analyze or diagnose the waveforms easily, for example.

Moreover, a terminal capable of accessing the external server can be used. Then, the terminal can access the external server and obtain data regarding the reference waveform or the load waveform of the press load to indicate it on the terminal for confirmation.

The above description of the present example is of functions of controller 40, 40# provided in the press machine. The functions, however, are not limited to the press machine. When the press machine is connected through a network to an external server, the functions may be performed in cooperation with a CPU of the external server. The indication on the display unit is not limited to indication on the display unit of the press machine, and may be indication on a display unit of a terminal connectable to the press machine through a network.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 6 control panel; 10 press machine; 4, 12 bed; 14 upright; 16 crown; 18 moving bolster; 20 slide; 22 die; 22A upper die; 22B lower die; 24 work transport device; 30 transfer bar; 31 feed drive mechanism; 35 work holder; 37 clamp drive mechanism; 40 controller; 42 detection unit; 43 reference waveform generation unit; 44 determination unit; 45 abnormality notification unit; 46 count unit; 47 acceptance unit; 48 registration unit; 50 memory; 60 right load sensor; 62 left load sensor; 100 coil holder; 110 leveler feeder; 120 transport conveyer

The invention claimed is:

1. A press system comprising:
a press machine including
  a detection unit configured to detect a press load applied by the press machine to a workpiece;
  a reference waveform generation unit configured to generate a reference waveform for comparison, based on a load waveform of the press load detected by the detection unit; and
  a determination unit configured to determine whether a press abnormality is present, based on the load waveform of the press load detected by the detection unit and the reference waveform,
wherein the reference waveform generation unit is configured to generate, when the detection unit detects a same load waveform of the press load a plurality of times, the reference waveform based on the same load waveform.

2. The press system according to claim 1, wherein
the detection unit is configured to detect respective press loads at a plurality of locations,
the reference waveform generation unit is configured to generate a plurality of reference waveforms for the respective plurality of locations, based on respective load waveforms of the press loads detected at the plurality of locations by the detection unit, and
the determination unit is configured to determine whether a press abnormality is present, based on the load waveforms of the press loads detected at the plurality of locations by the detection unit, and the reference waveforms for the respective plurality of locations.

3. The press system according to claim 1, wherein
the reference waveform generation unit is configured to generate, when the detection unit successively detects a same load waveform of the press load a plurality of times, the reference waveform based on the same load waveform.

4. The press system according to claim 1, further comprising an acceptance unit configured to allow selection of one of a mode for registering the reference waveform in response to an instruction from a user and a mode for generating the reference waveform by the reference waveform generation unit.

5. The press system according to claim 1, further comprising a count unit configured to count the number of times the press load is applied, based on a result of determination by the determination unit.

6. The press system according to claim 1, further comprising an abnormality notification unit configured to provide notification of an abnormality based on a result of determination by the determination unit.

7. The press system according to claim 1, further comprising an abnormality notification unit configured to provide notification of an abnormality when the detection unit detects a different load waveform of a press load a predetermined number of times.

8. The press system according to claim 7, wherein
the predetermined number of times is set to a numerical value larger than the number of stations for dies of the press system.

9. The press system according to claim 1, wherein
the reference waveform generation unit is configured to generate and update, when the detection unit detects a same load waveform of the press load a plurality of times, the reference waveform at predetermined intervals based on the same load waveform.

10. The press system according to claim 9, further comprising a registration unit configured to store, in a storage unit, the reference waveform generated at the predetermined intervals.

11. A control method for a press system, the control method comprising:
detecting a press load applied by a press machine to a workpiece;
generating a reference waveform for comparison, based on a load waveform of the detected press load; and
determining whether a press abnormality is present, based on the load waveform of the detected press load and the reference waveform,
wherein the generating of the reference waveform includes generating the reference waveform when a same load waveform of the press load is detected a plurality of times, based on the same load waveform.

12. A press system comprising:
a press machine including
a detection unit configured to detect a press load applied by the press machine to a workpiece;
a storage unit configured to store a load waveform of the detected press load;
a setting unit configured to set a representative load waveform of the press load based on a plurality of load waveforms of press loads stored in a predetermined period; and
a display unit configured to indicate the representative load waveform of the press load that is set by the setting unit,
wherein the display unit is configured to superimpose and indicate respective representative load waveforms of press loads that are set by the setting unit for respective predetermined periods different from one another in time.

13. The press system according to claim 12, wherein
the representative load waveform of the press load is an average waveform of the plurality of load waveforms of press loads in the predetermined period, and the predetermined period is set to one month.

14. A control method for a press system, the control method comprising:
detecting a press load applied by a press machine to a workpiece;
storing a load waveform of the detected press load;
setting a representative load waveform of the press load based on a plurality of load waveforms of press loads stored in a predetermined period; and
indicating the set representative load waveform of the press load,
wherein the indicating includes superimposing and indicating respective representative load waveforms of press loads that are set for respective predetermined periods different from one another in time.

15. The control method for a press system according to claim 14, wherein
the representative load waveform of the press load is an average waveform of the plurality of load waveforms of press loads in the predetermined period, and the predetermined period is set to one month.

* * * * *